(12) United States Patent
Zhang et al.

(10) Patent No.: US 12,342,406 B2
(45) Date of Patent: Jun. 24, 2025

(54) METHODS AND APPARATUS FOR DATA TRANSMISSION IN CONNECTIONLESS WAY

(71) Applicant: MediaTek Singapore Pte. Ltd., Singapore (SG)

(72) Inventors: Yuanyuan Zhang, Beijing (CN); Chia-Chun Hsu, Hsin-Chu (TW)

(73) Assignee: MediaTek Singapore Pte. Ltd., Singapore (SG)

(*) Notice: Subject to any disclaimer, the term of this patent is extended or adjusted under 35 U.S.C. 154(b) by 494 days.

(21) Appl. No.: 17/390,699

(22) Filed: Jul. 30, 2021

(65) Prior Publication Data

US 2022/0039194 A1 Feb. 3, 2022

Related U.S. Application Data

(63) Continuation of application No. PCT/CN2020/106088, filed on Jul. 31, 2020.

(30) Foreign Application Priority Data

Jul. 26, 2021 (CN) .......................... 202110844835.5

(51) Int. Cl.
*H04W 76/27* (2018.01)
*H04W 72/23* (2023.01)
(Continued)

(52) U.S. Cl.
CPC ........... *H04W 76/27* (2018.02); *H04W 72/23* (2023.01); *H04W 74/0833* (2013.01); *H04W 56/0015* (2013.01); *H04W 56/0045* (2013.01)

(58) Field of Classification Search
CPC . H04W 76/27; H04W 72/23; H04W 74/0833; H04W 56/0015; H04W 56/0045
See application file for complete search history.

(56) References Cited

U.S. PATENT DOCUMENTS

2017/0099660 A1* 4/2017 Oh .................. H04L 5/0064
2020/0196264 A1* 6/2020 Shih ................ H04W 74/0833
(Continued)

FOREIGN PATENT DOCUMENTS

CN       111246590 A     6/2020
WO    WO 2015/171065    11/2015
(Continued)

OTHER PUBLICATIONS

3GPP TS 36.331 V16.1.1 (Jul. 26, 2020) (Year: 2020).*

*Primary Examiner* — Michael J Moore, Jr.
(74) *Attorney, Agent, or Firm* — Helen Mao; Imperium Patent Works (57) ABSTRACT

Apparatus and methods are provided for connectionless data transfer. In one novel aspect, the UE in INACTIVE state initiates one or more data transmissions without RRC connection upon determining one or more preconfigured transmission conditions. The UE restores an INACTIVE AS context, establishes UL resources, and performs connectionless data transmissions. The UE monitors one or more preconfigured fallback conditions for fallback procedures and monitors stop conditions for suspension/stopping procedures. In one embodiment, the UL resources for the one or more data transmission are preconfigured configuration grant (CG) resources from the network. In one embodiment, the preconfigured UL resource is used for the data transmission only when the TA is valid. When the TA is not valid, the UE performs RA procedure and either uses the preconfigure resource or continues the one or more data transmissions by monitoring PDCCH with C-RNTI.

18 Claims, 6 Drawing Sheets

(51) Int. Cl.
*H04W 74/0833* (2024.01)
*H04W 56/00* (2009.01)

(56) References Cited

U.S. PATENT DOCUMENTS

| | | | |
|---|---|---|---|
| 2021/0105808 A1* | 4/2021 | Lei .................... | H04W 72/1273 |
| 2021/0297976 A1* | 9/2021 | Medina Acosta ... | H04W 56/003 |
| 2021/0307055 A1* | 9/2021 | Tsai ...................... | H04W 76/38 |
| 2021/0377844 A1* | 12/2021 | Tseng ................... | H04W 48/10 |
| 2022/0014980 A1* | 1/2022 | Tseng ................... | H04W 48/12 |
| 2022/0022276 A1* | 1/2022 | Shih .................. | H04W 72/0453 |
| 2022/0039194 A1* | 2/2022 | Zhang ................... | H04W 76/27 |
| 2023/0156847 A1* | 5/2023 | Zhang .................. | H04W 76/20 |
| | | | 370/329 |
| 2023/0199895 A1* | 6/2023 | Zhang ............... | H04W 72/1263 |
| | | | 370/329 |

FOREIGN PATENT DOCUMENTS

| WO | WO 2018/086107 | 5/2018 | |
|---|---|---|---|
| WO | WO-2021023185 A1 * | 2/2021 | .............. H04W 4/70 |

* cited by examiner

METHODS AND APPARATUS FOR DATA TRANSMISSION IN CONNECTIONLESS WAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2020/106088, titled "Apparatus and methods for data transfer in connectionless way," with an international filing date of Jul. 31, 2020. This application claims priority under 35 U.S.C. § 119 from Chinese Application Number CN 202110844835.5 titled "METHODS AND APPARATUS FOR DATA TRANSMISSION IN CONNECTIONLESS WAY" filed on Jul. 26, 2021. The disclosure of each of the foregoing documents is incorporated herein by reference.

TECHNICAL FIELD

The disclosed embodiments relate generally to wireless communication, and, more particularly, to data transfer in connectionless way.

BACKGROUND

The fifth generation (5G) radio access technology (RAT) will be a key component of the modern access network. It will address high traffic growth, energy efficiency and increasing demand for high-bandwidth connectivity. It will also support massive numbers of connected devices and meet the real-time, high-reliability communication needs of mission-critical applications. The 5G network introduces RRC INACTIVE state to reduce control plane and user plane latency. In the RRC INACTIVE state, the UE is always connected from the CN aspect so that the transition from the INACTIVE state to the CONNECTED is more efficiency than from the IDLE state to the CONNECTED. However, the UE needs to perform state transition from INACTIVE to CONNECTED state and complete connection resume procedures first for any DL and UL data The data transmission and reception are performed in the CONNECTED state. Connection setup and subsequently release to INACTIVE state happens for each data transmission. The transition comprises extensive signaling sequence between the UE and the network. When the amount of data that wireless devices exchange with the network is small and usually not urgent enough to justify the high battery consumption required to handle all the signaling involved in the legacy INACTIVE-to-CONNECTED transition.

Improvements are required to use the connectionless data transfer for more efficient small-data transmission and reception.

SUMMARY

Apparatus and methods are provided for connectionless data transfer. In one novel aspect, the UE in INACTIVE state initiates one or more data transmissions without RRC connection upon determining one or more preconfigured transmission conditions. The UE restores an INACTIVE AS context, establishes UL resources, and performs connectionless data transmissions. In one embodiment, the UE monitors one or more preconfigured fallback conditions and stop conditions. The UE stops the one or more data transmission in the UE INACTIVE state upon detecting one or more stop conditions. The UE performs a state transition from the UE INACTIVE state to a UE CONNECTED state upon detecting the one or more preconfigured fallback conditions. In one embodiment, the one or more preconfigured transmission conditions comprises the UE is in a current coverage area, a size of data packets for transmission is below a preconfigured small-data threshold, and a network capability of the wireless networking supporting data transceiving without RRC connection. In one embodiment, the UL resources for the one or more data transmission are preconfigured configuration grant (CG) resources from the network. In one embodiment, the preconfigured UL resource is used for the data transmission only when the TA is valid. When the TA is not valid, in one embodiment, the UE performs RA procedure to acquire a UL time alignment. The UE uses the preconfigured UL resource upon UL time aligned. In another embodiment, when the TA is not valid, the preconfigured CG resources are released, and the UE continues the one or more data transmissions by monitoring physical downlink control channel (PDCCH) with cell radio network temporary identifier (C-RNTI). In one embodiment, a PDCP entity is maintained without re-establishing for the one or more data transmissions in the UE INACTIVE state, wherein the PDCP entity maintains PDCP sequence numbers (SNs) and applies same security keys and security configuration among multiple data transmissions.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Aspects of the present disclosure provide methods, apparatus, processing systems, and computer readable mediums for NR (new radio access technology, or 5G technology) or other radio access technology. NR may support various wireless communication services, such as enhanced mobile broadband targeting wide bandwidth, millimeter wave targeting high carrier frequency, massive machine type communications targeting non-backward compatible MTC techniques, and/or mission critical targeting ultra-reliable low-latency communications. These services may include latency and reliability requirements. These services may also have different transmission time intervals (TTI) to meet respective quality of service (QoS) requirements. In addition, these services may co exist in the same subframe.

Figure 1:
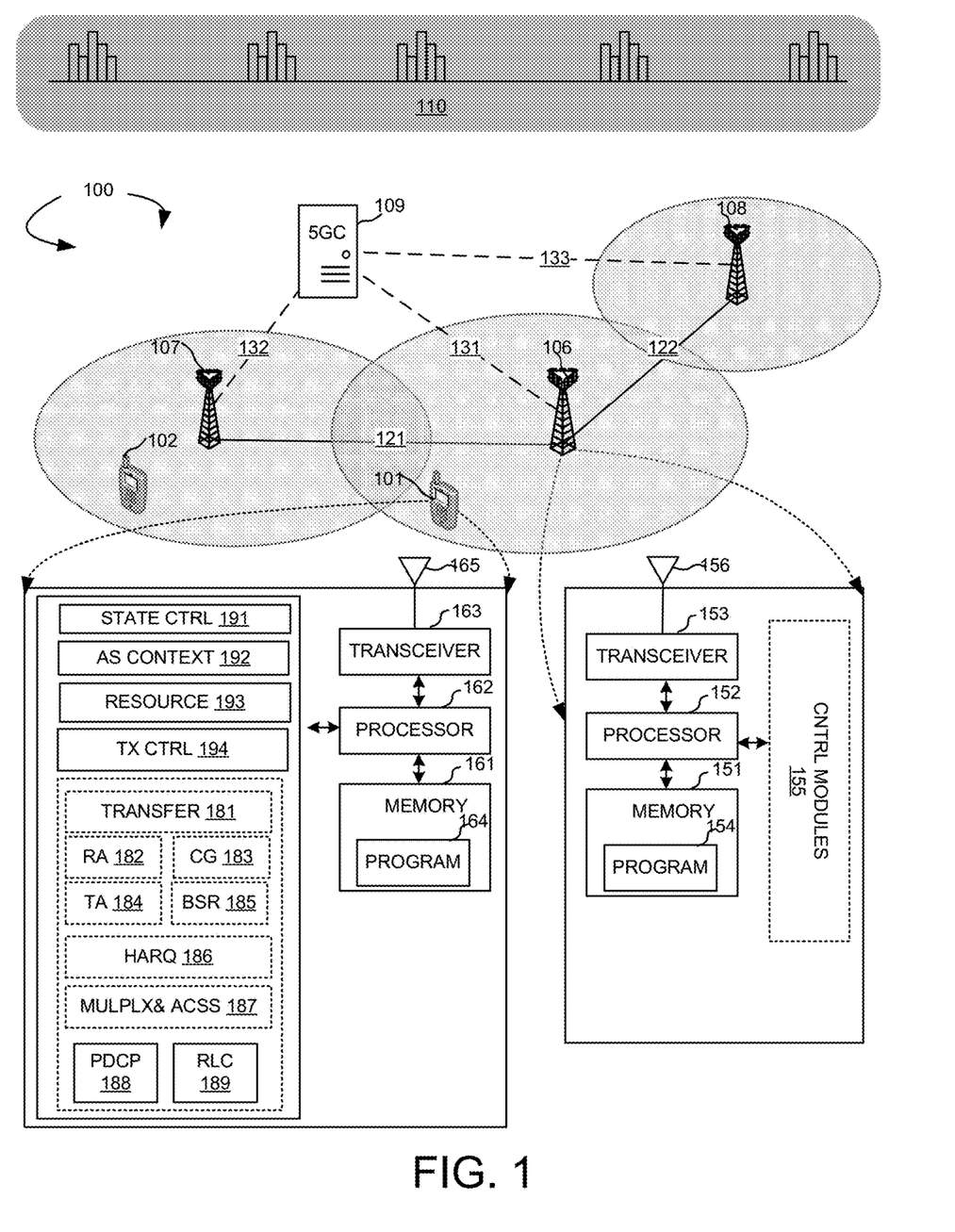
FIG. 1 is a schematic system diagram illustrating an exemplary wireless communication network that supports connectionless data transfer.

FIG. 1 is a schematic system diagram illustrating an exemplary wireless communication network 100 that supports connectionless data transfer. Wireless communication network 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. As an example, base stations serve a number of mobile stations within a serving area, for example, a cell, or within a cell sector. In some systems, one or more base stations are coupled to a controller forming an access network that is coupled to one or more core networks. gNB 106, gNB 107 and gNB 108 are base stations in the wireless network, the serving area of which may or may not overlap with each other. As an example, user equipment (UE) 101 or mobile station 101 is in the serving area covered by gNB 106 and gNB 107. As an example, UE 101 or mobile station 101 is only in the service area of gNB 106 and connected with gNB 106. UE 102 or mobile station 102 is only in the service area of gNB 107 and connected with gNB 107. gNB 106 is connected with gNB 107 via Xn interface 121. gNB 106 is connected with gNB 108 via Xn interface 122. A 5G network entity 109 connects with gNB 106, 107, and 108 via NG connection 131, 132, and 133, respectively. In one embodiment, UE 101 is configured to be able to transmit data in INACTIVE without the transition to CONNECTED state.

In one novel aspect, the UE initiates connectionless data transmission and/or reception in the INACTIVE state. The connectionless data transmission does not establish an RRC connection. In one embodiment, the data transmission is small-data transmission as in 110. The NR network supports many services with infrequent and small-data packets. For example, traffic from instant messaging (IM) services, heartbeat/keep-alive traffic from IM/email clients and other apps and push notifications from various applications are the typical use cases of smart phone applications. For non-smartphone applications, traffic from wearables, sensors and smart meters/smart meter networks sending periodic meter readings are the typical use cases. For these small-data 110 the data transmission and/or reception are initiated in the INACTIVE state without RRC connections.

FIG. 1 further illustrates simplified block diagrams of a base station and a mobile device/UE that supports connectionless data transfer. FIG. 1 includes simplified block diagrams of a UE, such as UE 101. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for High Frequency (HF) transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in UE 101. Memory 161 stores program instructions and data 164 to control the operations of UE 101. The memory 161 also stores UE INACTIVE AS CONTEXT, which includes the current KgNB and KRRCint keys, the robust header compression (ROHC) state, the stored QoS flow to dedicated radio bearer (DRB) mapping rules, the cell radio network temporary identifier (C-RNTI) used in the source PCell, the cell Identity and the physical cell identity of the source PCell, and/or some other parameters. In one embodiment, the UE INACTIVE AS CONTEXT also has another set of parameters configured for data transmission in INACTIVE, which includes the configurations for physical layer and MAC layer. In one embodiment, the physical layer configuration includes pre-configured UL resources, which can be used for UL data transmission in INACTIVE. In one embodiment, the physical layer configuration includes MAC configuration, e.g., MAC-CellGroupConfig. Antenna 165 sends uplink transmission and receives downlink transmissions to/from antenna 156 of gNB 106.

The UE also includes a set of control modules that carry out functional tasks. These control modules can be implemented by circuits, software, firmware, or a combination of them. A state control module 191 initiates one or more data transmissions in a UE INACTIVE state without radio resource control (RRC) connection upon determining one or more preconfigured transmission conditions in a wireless network. An AS context module 192 restores an INACTIVE access stratum (AS) context stored in the UE, wherein the INACTIVE AS context comprises an INACTIVE data transmission configuration. A resource module 193 establishes UL resources for the one or more data transmissions in the UE INACTIVE state based on the INACTIVE AS context. A transmission control module 194 performs the one or more data transmissions in the UE INACTIVE state using the UL resources.

The control modules perform additional tasks to carry out the data transceiving in the INACTIVE state. A transfer of data 181 is performed at the PDCP layer. A PDCP entity 188 and an RLC entity 189 are configured for the connectionless data transfer. PDCP entity 188 is maintained without re-establishing for the one or more data transmissions in the UE INACTIVE state, wherein the PDCP entity maintains PDCP sequence numbers (SNs) and applies same security keys and security configuration among multiple data transmissions. In one embodiment, the PDCP layer supports the functions of transfer of data, maintenance of PDCP SN, header compression and decompression using the ROHC protocol, ciphering and deciphering, integrity protection and integrity verification, timer based SDU discard, routing for split bearer, duplication, re-ordering and in-order delivery; out of order delivery and duplication discarding. In one embodiment, one PDCP entity of the DRB supporting data transmission in INACTIVE maintains the PDCP SN and applies the same security keys and security configuration among the multiple bursts data transmission in INACTIVE state. PDCP re-establishment is not performed when UE stays in INACTIVE state performing data transmission. In one embodiment, the state of the RLC entity of the DRB is maintained and not re-established among the multiple bursts data transmission in INACTIVE state. It is re-established only when state transition between INACTIVE and CONNECTED occurs.

UE also includes multiple function modules in MAC layer that carry out different tasks in accordance with embodiments of the current invention. Random access (RA) module 182 controls and performs random access. It supports 2-step RA procedure and 4-step RA procedure. Configuration grant (CG) module 183 performs data transmission on the pre-configured PUSCH resources. Time alignment (TA) module 184 controls and performs the UL time alignment procedure. Buffer status report (BSR) module 185 calculates the data amount available for transmission in L2 buffer and performs BSR. In one embodiment, BSR module 185 controls the scheduling request (SR) procedure. HARQ module 186 performs HARQ process for one or multiple transport blocks (TBs). Multiplex and assembly module 187 performs logical channel prioritization, multiplexes the data from multiple logical channels and generates the MAC packet data units (PDUs).

FIG. 1 includes simplified block diagrams of a gNB, such as gNB 106. gNB 106 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 106. Memory 151 stores program instructions and data 154 to control the operations of gNB 106. gNB 106 also includes a set of control modules 155 that carry out functional tasks to communicate with mobile stations. The set of control modules 155 includes a RRC state controller, a DRB controller, an INACTIVE AS CONTEXT controller, and a protocol controller. The RRC state controller controls UE RRC state by sending command to UE or providing configuration for the conditions. The DRB controller suspends or resumes the DRBs of a UE. In one embodiment, the DRB is resumed when a burst of data is to be transmitted. The DRB is suspended when the transmission of data burst is finished. The INACTIVE AS CONTEXT controller manages to store, restore, or release the UE INACTIVE AS CONTEXT. The protocol controller controls the establishment, re-establishment, release, reset, configuration of the user plane protocols including PDCP, RLC and MAC. In one embodiment, the SDAP layer is optionally configured. The gNB also includes multiple function modules in MAC layer that carry out different tasks in accordance with embodiments of the current invention. An RA module performs random access for a UE. It supports 2-step RA procedure and 4-step RA procedure. A CG module receives data on the pre-configured PUSCH resources. A TA module, controls and performs the UL time alignment procedure for a UE. A HARQ module performs HARQ process for one or multiple TBs. An assistant information module receives assistant information from the UE for scheduling. A De-multiplex and de-assembly module de-multiplexes and de-assembles the MAC PDUs received from the UE.

Figure 2:
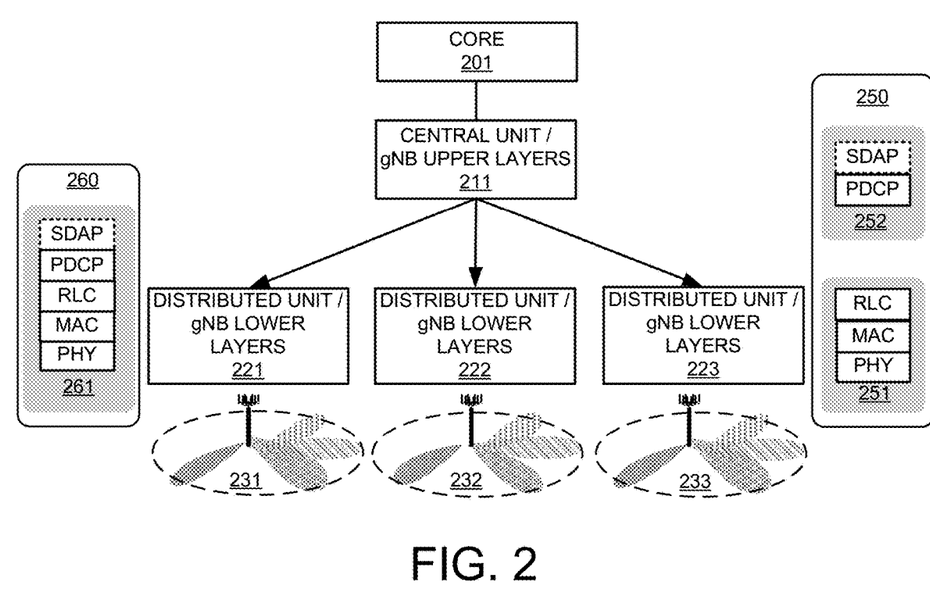
FIG. 2 illustrates an exemplary NR wireless system with centralized upper layers of the NR radio interface stacks.

FIG. 2 illustrates an exemplary NR wireless system with centralized upper layers of the NR radio interface stacks. Different protocol split options between central unit (CU) and distributed unit (DU) of gNB nodes may be possible. The functional split between the CU and DU of gNB nodes may depend on transport layer. Low performance transport between the CU and DU of gNB nodes can enable higher protocol layers of the NR radio stacks to be supported in the CU, since the higher protocol layers have lower performance requirements on the transport layer in terms of bandwidth, delay, synchronization, and jitter. In one embodiment, SDAP and PDCP layers are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stack 261 including SDAP, PDCP, RLC, MAC and PHY layers.

Figure 3:
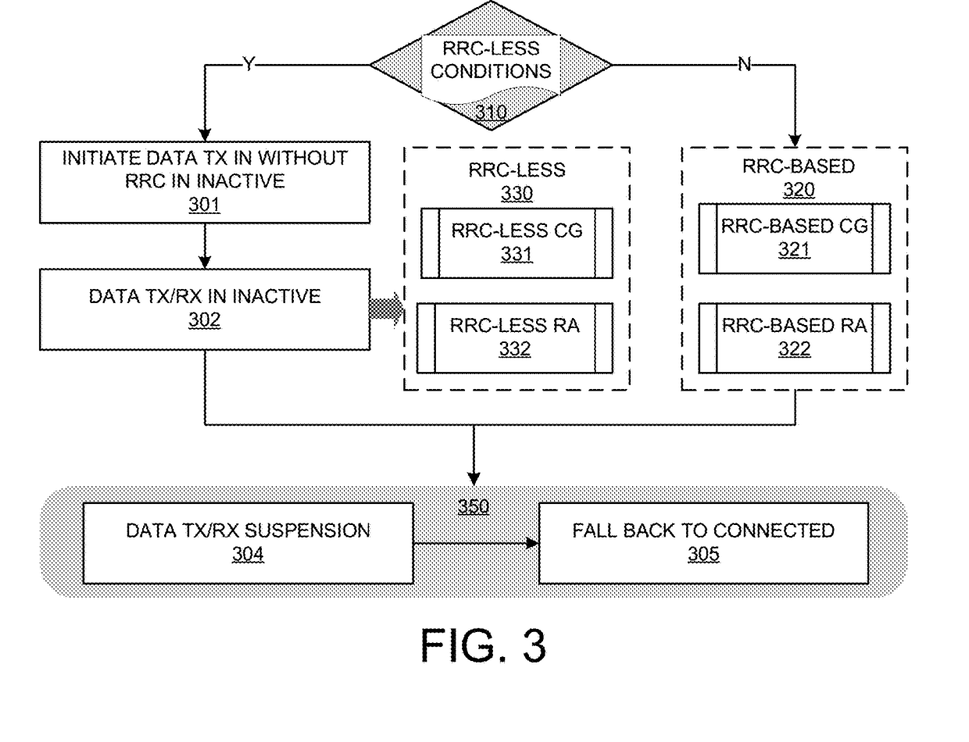
FIG. 3 illustrates an exemplary top-level flow diagram for connectionless data transfer with data suspension and fallback procedures.

FIG. 3 illustrates an exemplary top-level flow diagram for connectionless data transfer with data suspension/stop and fallback procedures. In one novel aspect, the UE performs one or more data transmissions of data packets in the INACTIVE state. In one embodiment, the one or more data transmissions are initiated in a UE INACTIVE state without RRC connection upon determining one or more preconfigured transmission conditions in a wireless network. At step 310, the UE determines if one or more preconfigured transmission conditions are met. In one embodiment, preconfigured transmission conditions comprise the UE is in a current coverage area, a size of data packets for transmission is below a preconfigured small-data threshold, and a network capability of the wireless networking supporting data transceiving without radio resource control (RRC) connection. If step 310 determines no, the UE performs RRC-based data transmission 320. In one embodiment, the RRC-based transmission is UL configuration grant (CG) based procedure 321. In another embodiment, the RRC-based transmission is RA-based procedure 322. If step 310 determines yes, the UE performs RRC-less data transmission in the INACTIVE state, which is the data transmission without an RRC connection. At step 301, the UE initiates data transmission in the INACTIVE state without RRC connection. At step 302, the UE performs one or more data transmissions and optionally receptions in INACTIVE state without RRC connection. Connectionless/RRC-less data transmission 330 has an option of RRC-less CG based procedure 331, or an RRC-less RA based procedure 332. For both RRC-based and RRC-less data transmissions in the INACTIVE state, at step 350, the UE monitors one or more preconfigured fallback conditions and/or one or more suspension/stop conditions. If the UE detects one or more preconfigured suspension/stop conditions, at step 304, the UE stops the data transmission and stays in INACTIVE state. In one embodiment, the one or more preconfigured suspension/stop conditions comprises receiving a command from the wireless network indicating a suspension of the one or more DRBs, a layer-2 (L2) buffer is empty, a suspension indication received from an upper layer of the UE, an expiration of a data-inactivity timer, a maximum number of new transport block (TB) transmission is not reached when a L2 buffer is empty. If the UE detects one or more preconfigured fallback conditions, at step 305, the UE falls back to the procedure to resume RRC connection. In one embodiment, the one or more preconfigured fallback conditions comprises receiving a command from the wireless network to go to CONNECTED state, an amount of continuous data packets arrival exceeds a preconfigured fallback threshold, a state transition to CONNECTED state indication received from an upper layer of the UE, a layer-2 (L2) buffer is not empty when the UE moves to another coverage area.

Figure 4:
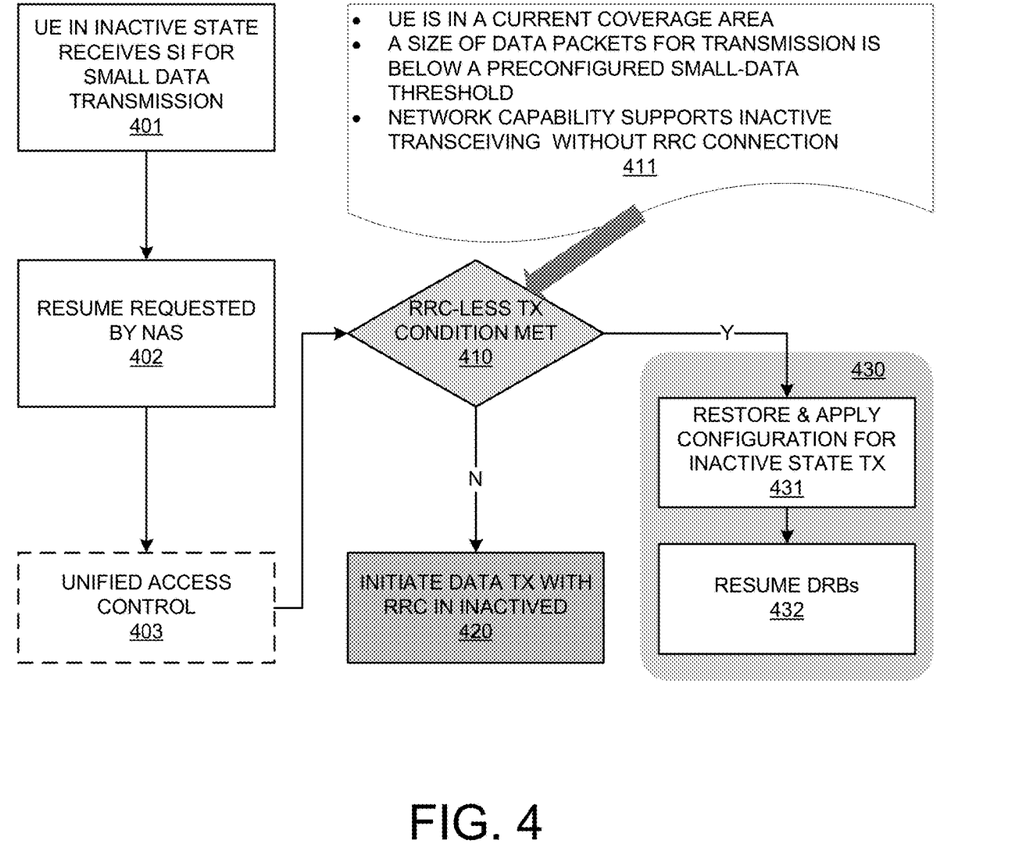
FIG. 4 illustrates an exemplary flow diagram for initiation of data transmission in the INACTIVE state without RRC connection.

FIG. 4 illustrates an exemplary flow diagram for initiation of data transmission in the INACTIVE state without RRC connection. At step 401, the UE in the INACTIVE state receives system information. In one embodiment, the system information provides configuration for UE to initiate small data transmission in INACTIVE. The threshold of data amount is provided in the system information. In one embodiment, at step 402, the user plane of UE receives the resume requested by NAS layer. In one embodiment, at step 403, the UE performs unified access control and initiate data transmission if the access attempt is not barred. In one embodiment, the UE does not need to perform the unified access control. Whether UE can skip the unified access control is configured by the network.

At step 410, UE checks whether it can transmit data without RRC connection based on certain conditions 411, which include the UE in a current coverage area; the data amount is below a threshold; the network is capable of data transmission/reception without RRC connection in INACTIVE. In one embodiment, the current coverage area is a set of cells including a current cell of the UE, and wherein the current coverage area is configured by the wireless network with a message selecting one from a system information and a RRC signaling. The different coverage areas with different sets of cells are configured by the network. UE can perform data transmission without RRC connections when it stays in the same area. When UE moves out of the area and goes into another area, UE needs to resume RRC connection to perform data transmission. The information for the area is provided by the system information or by dedicated RRC signaling. In one particular case, if such area is not configured, UE can initiate data transmission without RRC connection if UE moves within the same cell, i.e., no cell reselection occurs. In another embodiment, the preconfigured small-data threshold and the network capability are configured with a system information.

If step 410 determines yes that one or more RRC-less transmission conditions are met, the UE performs RRC-less data transmission 430. Otherwise, the UE moves to step 420 and initiates data transmission with RRC in INACTIVE state. At step 431, for RRC-less transmission, the UE restores the UE INACTIVE AS CONTEXT and applies the configuration including the security keys, the ROHC state, the stored QoS flow to DRB mapping rules, the C-RNTI used in the source PCell, the cellIdentity and the physical cell identity of the source PCell, and all other parameters configured for data transmission in INACTIVE. At step 432, the UE resumes the DRBs which are configured to be able to transmit data in INACTIVE. The MAC layer multiplexes the logical channels DTCH carrying DRBs, which have data for transmission in INACTIVE.

Figure 5:
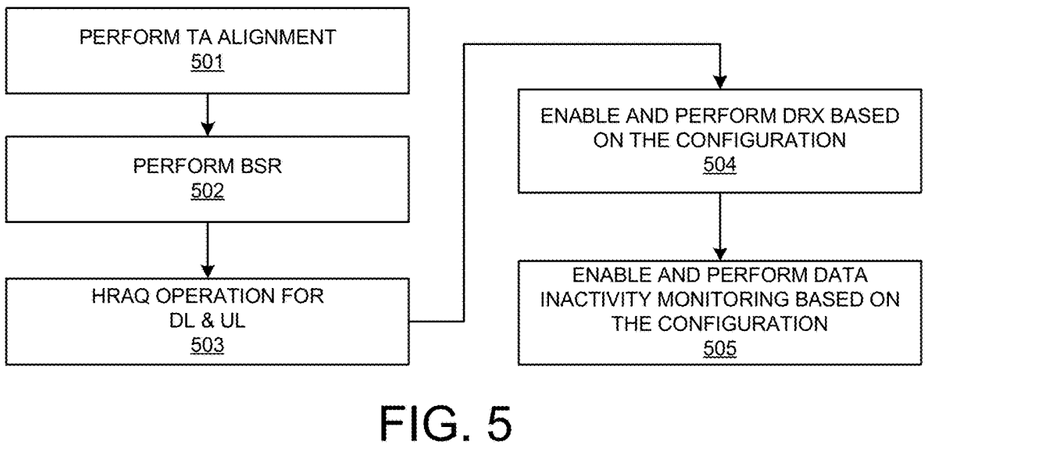
FIG. 5 illustrates an exemplary flow diagram for performing the data transmission procedure in the INACTIVE state.

FIG. 5 illustrates an exemplary flow diagram for performing the data transmission procedure in the INACTIVE state. In one novel aspect, UE stays in INACTIVE and enables HARQ, DRX, UL time alignment, BSR and data inactivity monitoring. At step 501, the UE performs TA procedure to obtain or maintain the UL time alignment. If the TA timer expires, the UE needs to initiate RA procedure to acquire the UL time alignment. At step 502, the UE performs BSR procedure to send BSR to the network. If there is no UL grant available, UE will initiate SR procedure. At step 503, the UE performs HARQ operation for one or more shots transmission. At step 504, the UE enables and performs DRX if DRX for data transmission in INACTIVE is configured. At step 505, the UE performs data inactivity monitoring if DataInactivityTimer for data transmission in INACTIVE is configured.

Figure 6:
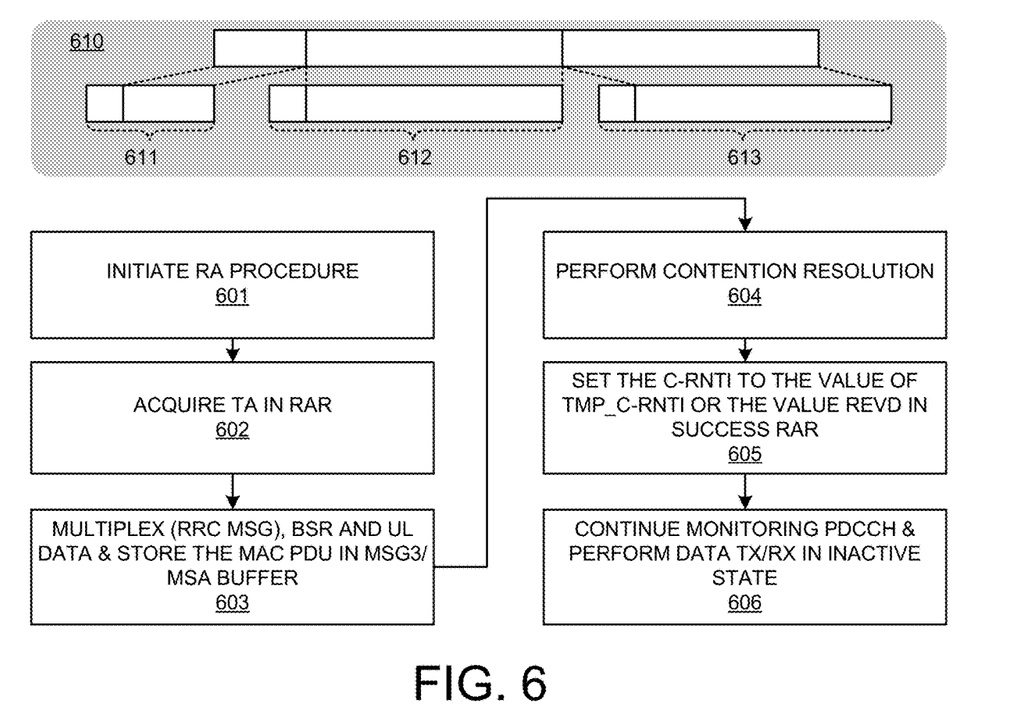
FIG. 6 illustrates an exemplary flow diagram for performing connectionless data transmission in the INACTIVE state through the RA procedure.

FIG. 6 illustrates an exemplary flow diagram for performing the connectionless data transmission with RA procedure in INACTIVE state. In one novel aspect, the data available for transmission in L2 is large and cannot be carried by Msg3/MsgA. The overall data packets, as in 610, are segmented into different parts and carried in different transport blocks (TBs) 611, 612, and 613. At step 601, the UE initiates RA procedure. At step 602, the UE acquires TA in RAR. At step 603, the UE multiplexes BSR and UL data in one MAC PDU and stores the MAC PDU in Msg3/MsgA buffer. In one embodiment, UE multiplexes RRC message (e.g., RRCResumeRequest), BSR and data optionally in the first UL transmission opportunity. At step 604, the UE performs contention resolution. If contention is resolved, at step 605, UE sets the C-RNTI to the value of the TEMPORARY_C-RNTI (4-step RA) or the value received in the successRAR (2-step RA). At step 606, the UE continues monitoring PDCCH and performs data transmission/reception in INACTIVE.

Figure 7:
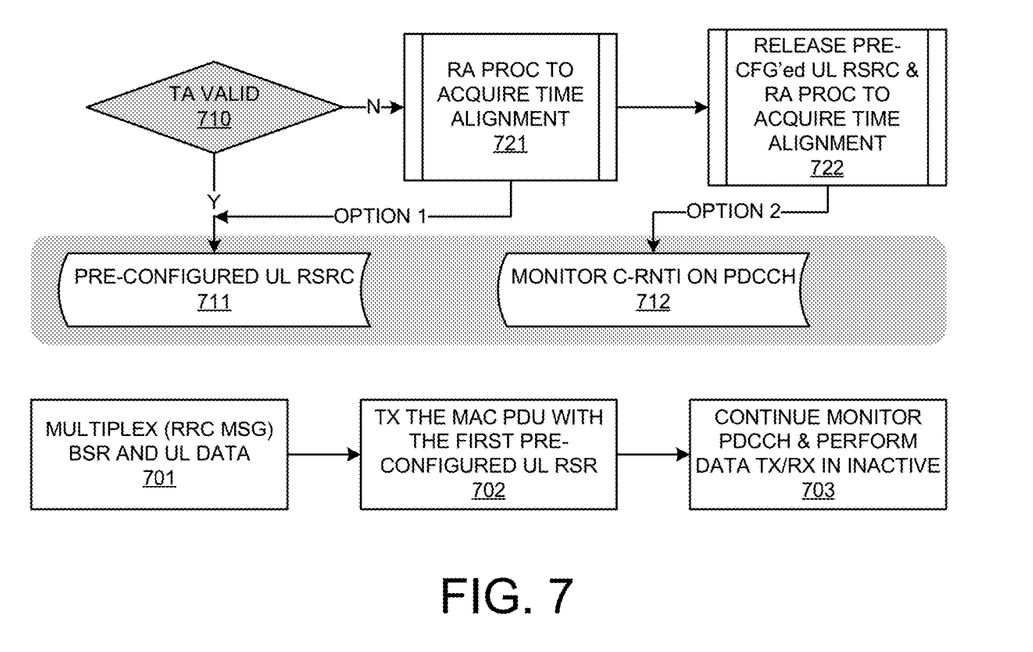
FIG. 7 illustrates an exemplary flow diagram for performing the connectionless data transmission through pre-configured UL resources in INACTIVE state.

FIG. 7 illustrates an exemplary flow diagram for performing the connectionless data transmission through pre-configured UL resources in INACTIVE state. In one novel aspect, the data available for transmission in L2 is large and cannot be carried by Msg3/MsgA. The overall data packets are segmented into different parts and carried in different transport blocks (TBs), as exemplary shown in 610. At step 701, the UE multiplexes BSR and UL data in one MAC PDU. In one embodiment, at step 702, the UE transmits the MAC PDU in the first UL transmission opportunity. In other words, the MAC PDU is transmitted with the first pre-configured UL resource. At step 703, the UE continues monitoring PDCCH and performs data transmission/reception in INACTIVE. In one embodiment, UE additionally provides UE ID in each UL transmission. The MAC CE containing UE ID is multiplexed with the UL data. In one embodiment, UE can only transmit data through pre-configured UL resources if UL TA is valid. At step 710, the UE determines If UL TA is valid. If the UL is valid, at step 711, the UE uses the preconfigured UL resources. In one embodiment, if UL TA is not valid, at step 721, the UE performs RA procedure to acquire the UL time alignment but keeps the per-configured UL resources. After that, at step 711, the UE continues data transfer by both the pre-configured UL resources and the resources dynamically scheduled by network. In another embodiment, if step 710 determines that the TA is not valid, at step 722, the UE releases the pre-configured UL resources and performs RA procedure to acquire the UL time alignment. After that, at step 712, the UE continues data transfer by monitoring PDCCH addressed to C-RNTI.

Figure 8:
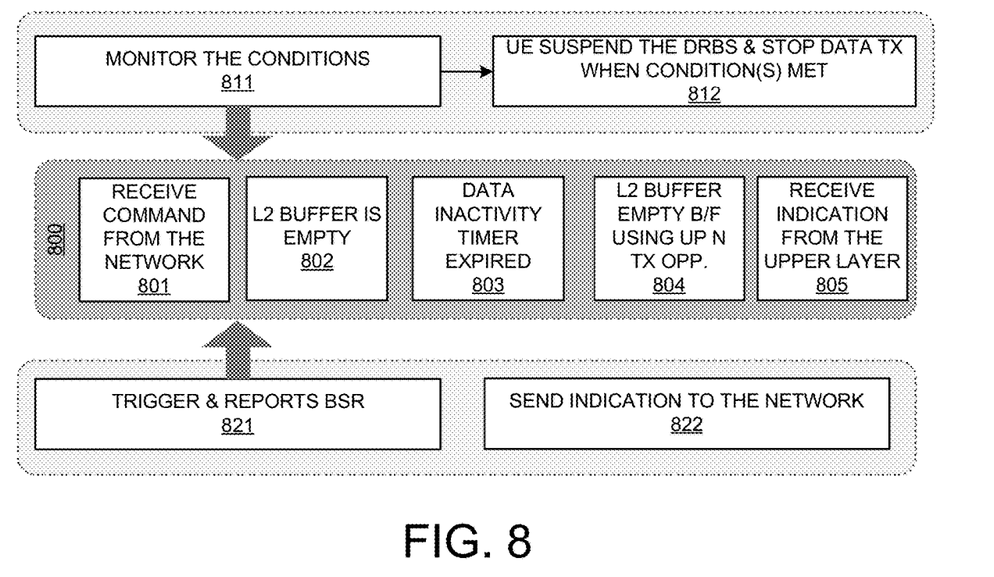
FIG. 8 illustrates exemplary flow diagrams for the procedure to stop the connectionless data transmission in the INACTIVE state.

FIG. 8 illustrates exemplary flow diagrams for the procedure to stop the connectionless data transmission in the INACTIVE state. In one embodiment, the UE stops data transmission in the INACTIVE state upon detecting one or more preconfigured stop conditions 800. At step 811, the UE monitors the suspension/stop conditions to suspend data transmission. When one of the suspension/stop condition is met, at step 812, the UE suspends the DRBs configured with data transmission in INACTIVE and stops data transmission. In one embodiment, the suspension/stop is controlled by network. The suspension/stop condition 801 is a command received from the network. In one embodiment, the command is RRCRelease message, which responds the RRCResumeRequest transmitted by UE before. In another embodiment, the suspension/stop is controlled by UE. The conditions are evaluated by the UE itself. A suspension/stop condition 802 is that the L2 buffer is empty. In one embodiment, the threshold number of new TB transmission opportunities N is configured. Another condition 803 is that the DataInactivityTimer expires, which implies that UE has no data for transmission/reception for a while. A condition 804 is that the L2 buffer is empty before the number of new transmission opportunities are used up. A condition 805 is that an indication is received from the upper layering, indicating that there is no further uplink or downlink data transmission is expected. In another embodiment, at step 821, the UE triggers and sends BSR report with the value '0' to network. In one embodiment, at step 822, the UE sends an indication to network when one of the conditions evaluated by the UE is satisfied. In one embodiment, UE receives RRCRelease message and stays in INACTIVE state.

Figure 9:
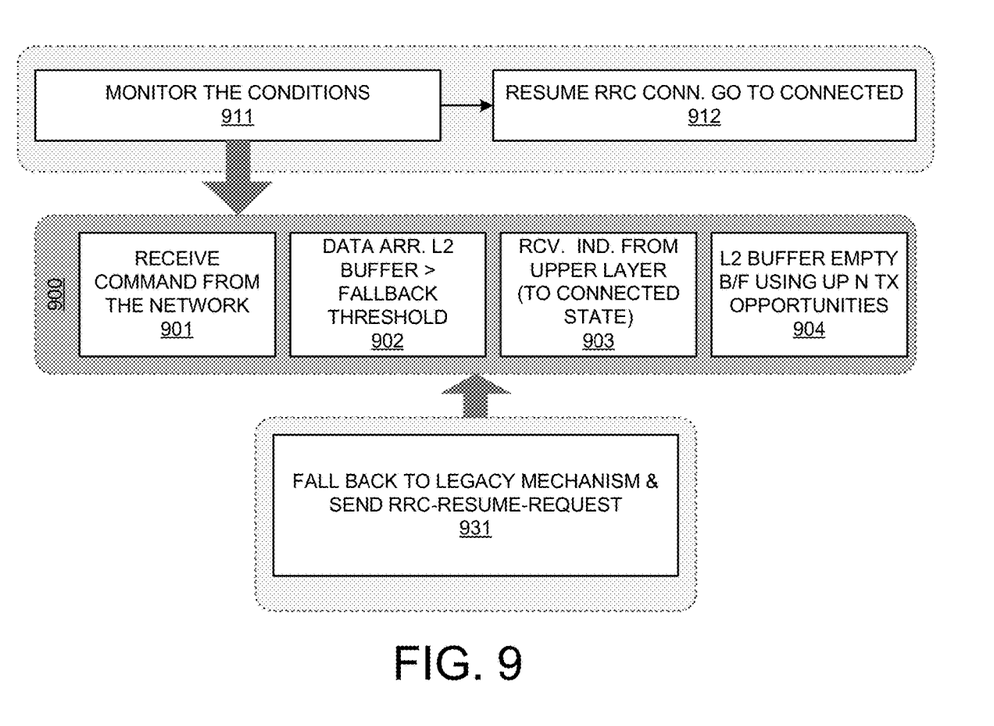
FIG. 9 illustrates exemplary flow diagrams for the fall back to RRC resume procedure and go to CONNECTED state.

FIG. 9 illustrates exemplary flow diagrams for the fall back to RRC resume procedure and go to CONNECTED state. One or more fallback conditions 900 are configured for the UE. At step 911, the UE monitors the fallback conditions to resume RRC connection. When the condition is met, at step 912, the UE resumes RRC connection and go to CONNECTED for further data transmission. In one embodiment, RRC connection resume is controlled by network. A condition 901 is that a command is received from the network. In one embodiment, the command is RRCResume message which responds the RRCResumeRequest transmitted by UE before. In one embodiment, RRC connection resume is controlled by UE. Therefore, the conditions are evaluated by the UE itself. A condition 902 is that the amount of data arrives in the L2 buffer exceeds a preconfigured fallback threshold. A condition 903 is that an indication is received from the upper layering, indicating a state transition to CONNECTED state. A condition 904 is that the L2 buffer is not empty before the number of new transmission opportunities are used up. In one embodiment, when one or more preconfigured fallback conditions are satisfied, at step 931, the UE fallbacks to the legacy mechanism and initiates RRC resume procedure by transmitting RRCResumeRequest message.

Figure 10:
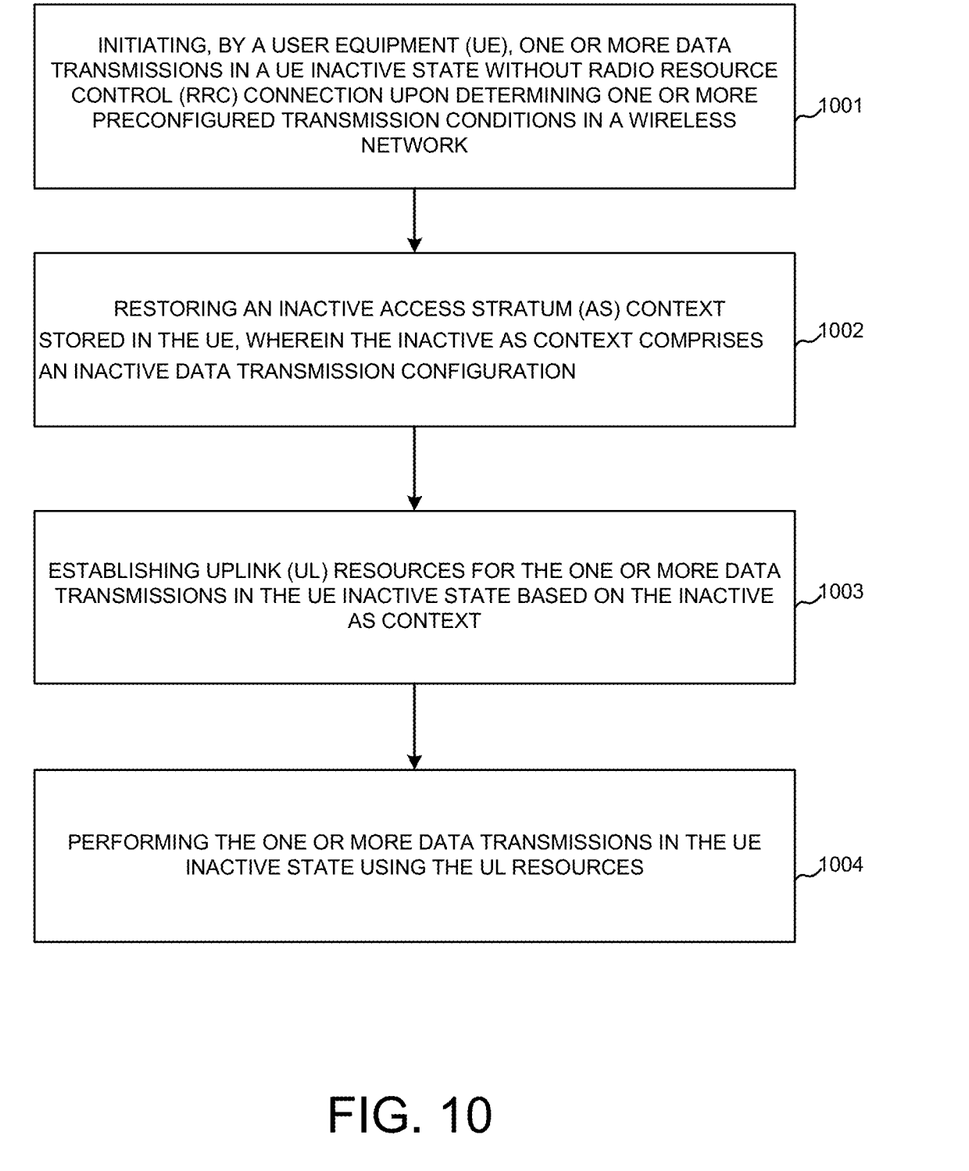
FIG. 10 illustrates an exemplary flow chart for the connectionless data transmission in the INACTIVE state.

FIG. 10 illustrates an exemplary flow chart for the connectionless data transmission in the INACTIVE state. At step 1001, the UE initiates one or more data transmissions in a UE INACTIVE state without radio resource control (RRC) connection upon determining one or more preconfigured transmission conditions in a wireless network. In step 1002, the UE restores an INACTIVE access stratum (AS) context stored in the UE, wherein the INACTIVE AS context comprises an INACTIVE data transmission configuration. In step 1003, the UE establishes UL resources for the one or more data transmissions in the UE INACTIVE state based on the INACTIVE AS context. In step 1004, the UE performs the one or more data transmissions in the UE INACTIVE state using the UL resources.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   initiating, by a user equipment (UE), one or more data transmissions in a UE INACTIVE state without radio resource control (RRC) connection upon determining one or more preconfigured transmission conditions in a wireless network;
   retrieving an INACTIVE access stratum (AS) context and a UE INACTIVE data transmission configuration, wherein the INACTIVE AS context is for small data transmission in the UE INACTIVE state and the UE INACTIVE data transmission configuration includes parameters for the one or more preconfigured transmission conditions comprising the UE is in a current coverage area, a size of data packets for transmission is below a preconfigured small-data threshold, and a network capability of the wireless networking supporting data transceiving without RRC connection;
   establishing uplink (UL) resources for the one or more data transmissions in the UE INACTIVE state based on the INACTIVE AS context; and
   performing the one or more data transmissions in the UE INACTIVE state using the UL resources.

2. The method of claim 1, wherein INACTIVE data transmission configuration includes at least a PHY layer configuration for UE INACTIVE data transmission and a MAC layer configuration for UE INACTIVE data transmission.

3. The method of claim 1, wherein the current coverage area is a set of cells including a current cell of the UE, and wherein the current coverage area is configured by the wireless network with a message selecting one from a system information and a RRC signaling.

4. The method of claim 1, wherein the preconfigured small-data threshold and the network capability are configured with a system information.

5. The method of claim 1, wherein the UL resources for the one or more data transmissions are preconfigured configuration grant (CG) resources from the wireless network.

6. The method of claim 5, wherein a timing advance (TA) of the UL resources is valid.

7. The method of claim 5, wherein the UE performs a random access (RA) procedure to acquire a UL time alignment when a TA of the UL resources is not valid.

8. The method of claim 7, wherein the preconfigured CG resources are released and the UE continues the one or more data transmissions by monitoring physical downlink control channel (PDCCH) with cell radio network temporary identifier (C-RNTI).

9. The method of claim 7, wherein the UE continues the one or more data transmissions using the preconfigured CG resources after the UE acquires the UL time alignment.

10. The method of claim 1, wherein the UE obtains the UL resources through an RA procedure and acquires TA in random access response (RAR).

11. The method of claim 1, further comprising
    monitoring at least one condition of one or more preconfigured fallback conditions and one or more preconfigured suspension/stop conditions;
    stopping the one or more data transmission in the UE INACTIVE state upon detecting the one or more preconfigured stopping conditions; and
    performing a state transition from the UE INACTIVE state to a UE CONNECTED state upon detecting the one or more preconfigured fallback conditions.

12. The method of claim 11, wherein the one or more preconfigured fallback conditions comprises receiving a command from the wireless network to go to the UE CONNECTED state, an amount of continuous data packets arrival exceeds a preconfigured fallback threshold, a state transition to the UE CONNECTED state indication received from an upper layer of the UE, and a layer-2 (L2) buffer is not empty when the UE moves to another coverage area.

13. The method of claim 1, wherein a packet data convergence protocol (PDCP) entity is maintained without re-establishing for the one or more data transmissions in the UE INACTIVE state, wherein the PDCP entity maintains PDCP sequence numbers (SNs) and applies same security keys and security configuration among multiple data transmissions.

14. A user equipment (UE) comprising:
 a radio frequency (RF) transceiver that transmits and receives radio signals in a wireless network;
 a memory; and
 a processor coupled to the memory, the processor configured to
 initiate transmissions in a UE INACTIVE state without radio resource control (RRC) connection upon determining one or more preconfigured transmission conditions in the wireless network;
 retrieve an INACTIVE access stratum (AS) context and a UE INACTIVE data transmission configuration, wherein the INACTIVE AS context is for small data transmission in the UE INACTIVE state and the UE INACTIVE data transmission configuration includes parameters for the one or more preconfigured transmission conditions comprising the UE is in a current coverage area, a size of data packets for transmission is below a preconfigured small-data threshold, and a network capability of the wireless networking supporting data transceiving without RRC connection;
 establish uplink (UL) resources for the one or more data transmissions in the UE INACTIVE state based on the INACTIVE AS context; and
 perform the one or more data transmissions in the UE INACTIVE state using the UL resources.

15. The UE of claim 14, wherein the current area is a set of cells including a current cell of the UE, and wherein the current area is configured by the wireless network with a message selecting one from a system information and a RRC signaling.

16. The UE of claim 14, wherein the preconfigured small-data threshold and the network capability are configured with a system information.

17. The UE of claim 14, wherein the UL resources for the one or more data transmissions are preconfigured configuration grant (CG) resources from the wireless network.

18. The UE of claim 17, wherein the UE performs a random access (RA) procedure to acquire a UL time alignment when a TA of the UL resources is not valid.

* * * * *